United States Patent [19]
Cwycyshyn et al.

[11] 3,794,350
[45] Feb. 26, 1974

[54] DEVICE FOR SECURING VEHICLE TO TRANSPORTER

[75] Inventors: Walter Cwycyshyn, Detroit; Anthony Buccellato, Harper Woods; Henry C. Hoffman, Lansing, all of Mich.

[73] Assignee: General Motors Corporation, Detroit, Mich.

[22] Filed: Dec. 1, 1972

[21] Appl. No.: 311,400

[52] U.S. Cl. ...... 280/179 R, 105/368 R, 105/368 T, 206/46 M, 248/119 R
[51] Int. Cl. ............................................ B60p 7/08
[58] Field of Search. 280/179 R, 179 A; 248/361 A, 248/361 R, 119 R, 309; 105/368 T, 368 R

[56] References Cited
UNITED STATES PATENTS

| | | | |
|---|---|---|---|
| 1,261,113 | 4/1918 | Fey | 105/368 T |
| 2,925,861 | 2/1960 | Long | 248/361 X |
| 3,102,646 | 9/1963 | Clejan | 105/368 T X |

Primary Examiner—David Schonberg
Assistant Examiner—Michael J. Forman
Attorney, Agent, or Firm—Edward J. Biskup

[57] ABSTRACT

A tie-down device for connecting a vehicle frame to a guide rail carried by a transporter and having a body portion which is formed at its upper end with a horizontal mounting member that is adapted to be received by an aperture in the side of the frame. The lower of the tie-down device has a shoe member with laterally spaced outwardly extending arms which are adapted to be received by the guide rail.

2 Claims, 4 Drawing Figures

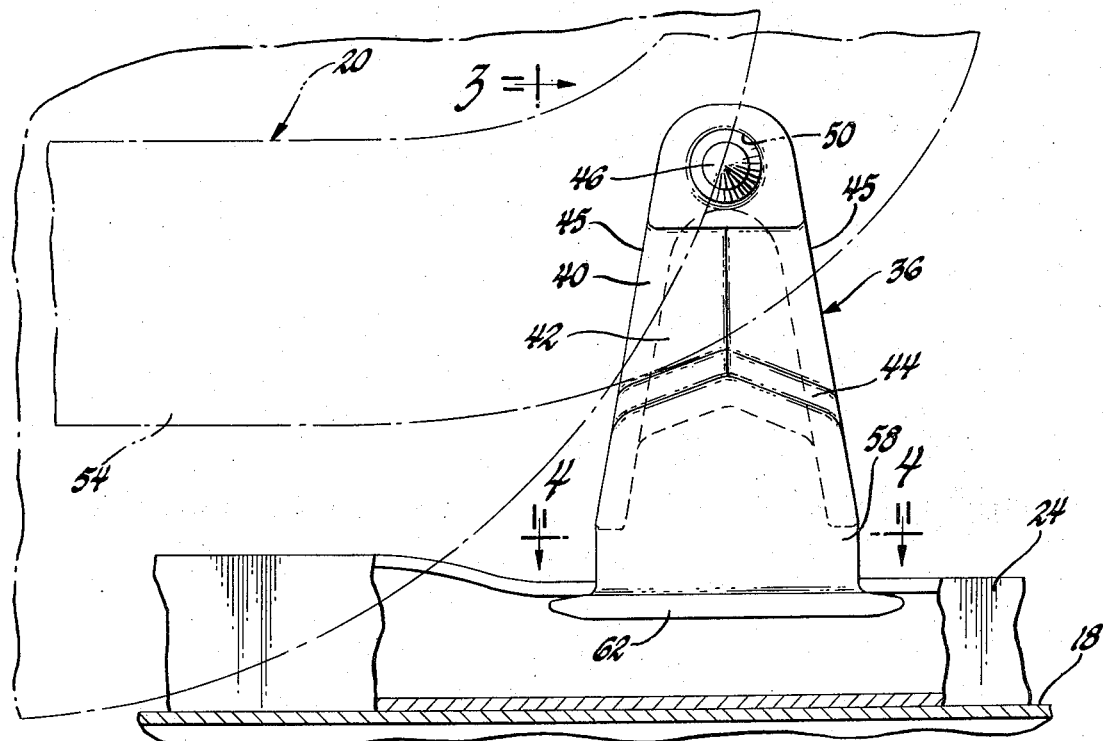
Fig. 2
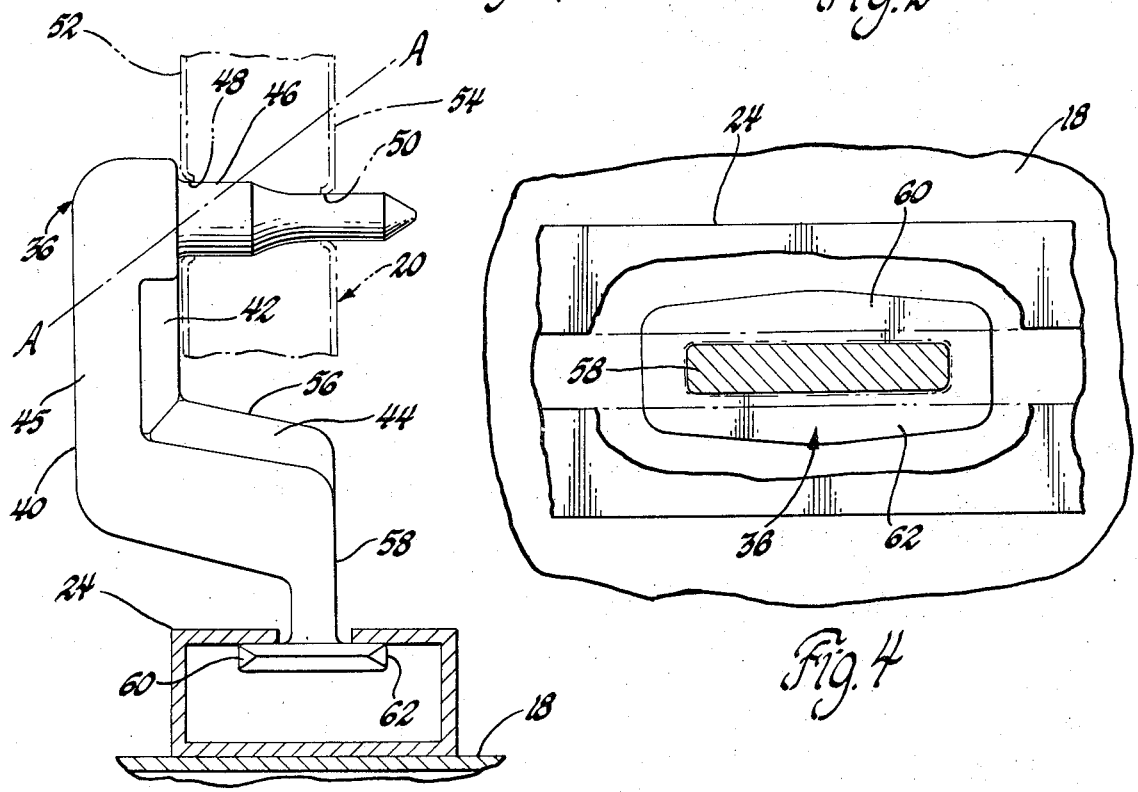
Fig. 3
Fig. 4

DEVICE FOR SECURING VEHICLE TO TRANSPORTER

Copending patent application Ser. No. 187,625 entitled "Vehicle Positioning and Restraint Apparatus," filed Oct. 5, 1971, now U.S. Pat. No. 3,739,906, and assigned to the assignee of this invention, discloses a positioning and restraint apparatus which permits a vehicle to be mechanically loaded into an enclosed carrier, positively located in a predetermined position, and secured to the floor of the carrier in a manner which prevents vertical, lateral, and longitudinal movement of the vehicle. The vehicle is provided with three tie-down devices which cooperate with three elongated parallel guide rails for restraining the vehicle from movement in a vertical and lateral direction. In addition, a latch mechanism is provided with at least one of the guide rails for locking one of the tie-down devices in a fixed position thereby precluding movement of the vehicle along the longitudinal axis of the rails.

Each of the tie-down devices associated with the apparatus described above is formed with a T-shaped key portion which can be inserted within a suitable oblong aperture provided in the vehicle frame and locked thereto by rotating the tie-down device 90° so as to position the laterally extending arms in an overlapping position relative to the frame. Although this form of locking arrangement for the tie-down devices serves to lock the devices to the vehicle, it has been found that a reinforcement plate must be attached to the frame to prevent damage thereto due to the large shear forces which tend to concentrate at the neck of the key portion.

The present invention is intended to alleviate the above problem by providing a tie-down device which is insertable within a pair of axially aligned apertures formed in laterally spaced side plates of the vehicle frame. Thus, the loading on the frame is distributed along two supporting members and thereby eliminates the need for a reinforcement plate of the type described above. In the preferred form, the tie-down device made according to the invention comprises a generally L-shaped body including a pair of leg members. One of the leg members is vertically orientated and rigidly supports at its upper end a stepped cylindrical mounting member which is located along a horizontal axis and is adapted to be received by the aforementioned apertures in the frame. The other of the leg members is located below the mounting member and has a downwardly inclined surface facing the mounting member so as to increase the spacing between the outer end of the mounting member and the other leg member. In addition, a shoe member vertically depends from the other leg member and has a pair of laterally spaced outwardly extending arms which are adapted to be received by the guide rail in the container.

The objects of the present invention are to provide a vehicle frame tie-down device that has a mounting member that is insertable into a pair of spaced apertures provided in the vehicle frame; to provide a tie-down device which has a stepped diameter mounting member for insertion into the side rail of a vehicle frame; and to provide a tie-down device for a vehicle frame that distributes the stress concentrations along a pair of axially aligned apertures which are located along a horizontal axis which is substantially normal to the longitudinal axis of the frame.

Other objects and advantages of the present invention will be apparent from the following detailed description when taken with the drawings in which:

FIG. 2 is an enlarged plan view showing one of the rear tie-down devices according to this invention taken on line 2—2 of FIG. 1;

FIG. 3 is a view taken on line 3—3 of FIG. 2; and

FIG. 4 is a view taken on line 4—4 of FIG. 2.

Figure 1:
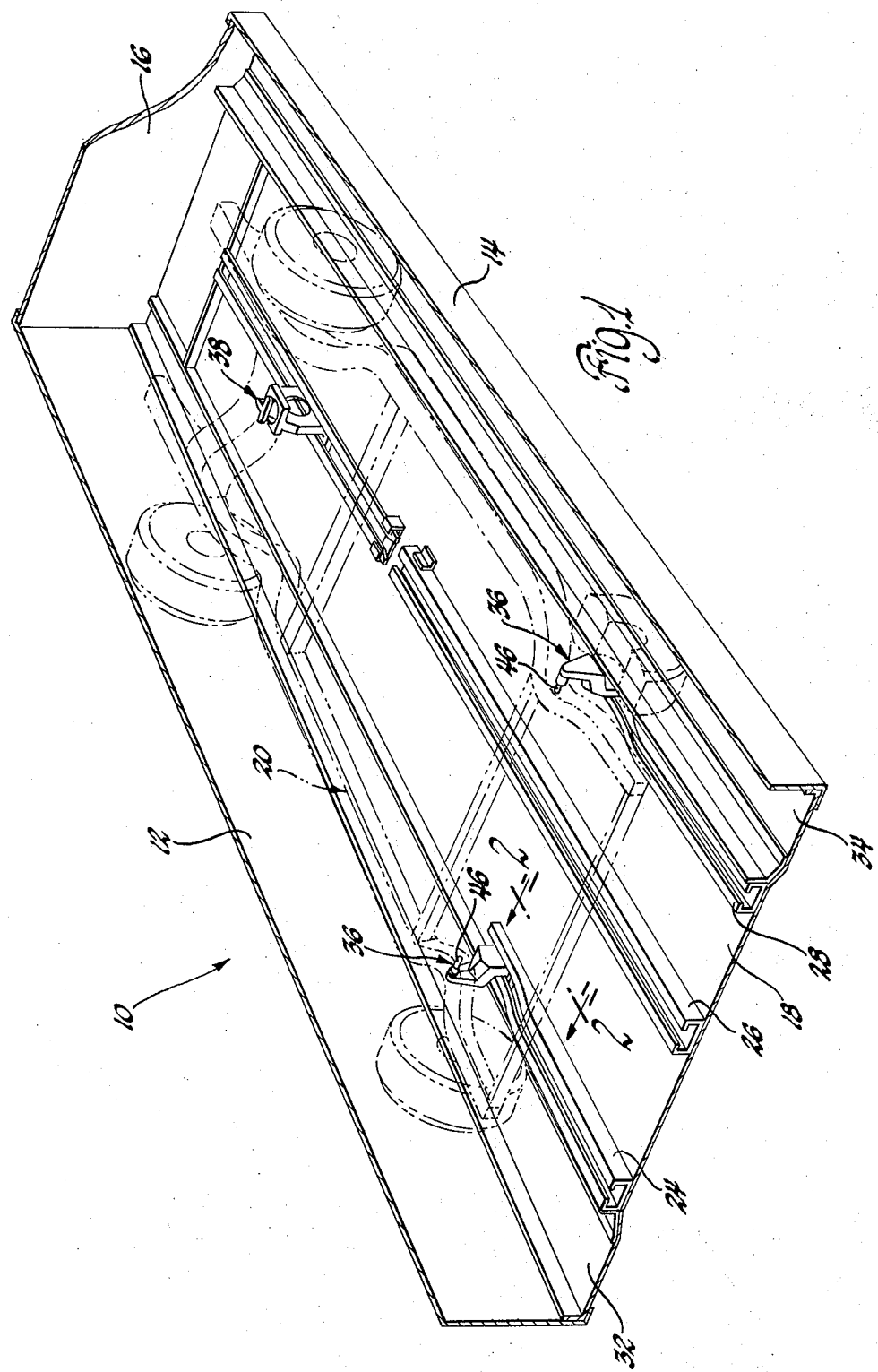
FIG. 1 is a perspective view showing a part of a shipping container incorporating a positioning and restraint apparatus which supports a vehicle using rear tie-down devices made according to the invention.

Referring to the drawings and more particularly FIG. 1 thereof, a shipping container 10 is shown comprising side walls 12 and 14 an end wall 16, and a floor portion 18. This shipping container is similar to the one illustrated in the aforementioned patent application and is intended to have multiple decks or floor portions, each of which is adapted to accommodate a vehicle, the frame 20 of which is shown in phantom lines. A positioning and restraint apparatus is incorporated with each floor portion 18 of the shipping container 10 for holding the vehicle in place when the shipping container is in transit on a carrier such as a railway car.

In this regard, it will be noted that the positioning and restraint apparatus comprises three elongated guide rails 24, 26, and 28 which are located in parallel planes with equal spacing between adjacent guide rails. Each guide rail is a channel member which in cross section is C-shaped and is fixedly secured to a raised planar portion that has parallel tracks 32 and 34 located on the opposite sides thereof. As should be apparent, the tracks 32 and 34 serve to accommodate the tires of the vehicle as the latter moves into the shipping container 10.

Each of the outer guide rails 24 and 28 is adapted to receive an identical tie-down device 36 according to the invention and shown in FIGS. 2, 3, and 4, while the center guide rail 26 is adapted to receive a tie-down device 38. In other words, as seen in FIG. 1, three tie-down devices are adapted to be attached to the vehicle frame 20 so as the vehicle is rolled into the open end of the shipping container 10, the tires are accommodated by the tracks 32 and 34 and each of the tie-down devices slides within one of the guide rails and serves to position the vehicle as well as prevent lateral and vertical movement thereof. Also, although not shown, each outer guide rail 24 and 28 carries a latch mechanism at the inner end thereof of a type shown in the aforementioned patent application. Each latch mechanism serves as a stop and includes a lock lever having a handle which is accessible from the open end of the container 10. The inner end of the lock lever is pivotally mounted to the floor portion by a pivotal connection which permits the lock lever to be rotated about a vertical axis for positioning a lock portion behind the tie-down device 36 and thereby prevent the latter from moving in a fore-and-aft direction.

As seen in FIGS. 2 and 3, the tie-down device 36 comprises a generally L-shaped body portion 40 which includes a vertically orientated leg 42 integrally formed with a generally horizontal leg 44. The upper or head end of the leg 42 merges with a pair of identical and converging ribs 45 which also extend below the leg 44. The ribs serve as reinforcement members for the legs 42 and 44. A mounting member 46 is rigidly formed with the upper end of leg 42 and is located along a horizontal axis. The mounting member 46 is cylindrical in cross-section with a stepped diameter and is adapted to be received by a pair of axially aligned circular openings 48 and 50 respectively formed in laterally spaced and vertically orientated side plates 52 and 54 of frame 20.

The leg 44 has a downwardly inclined surface 56 below the mounting member 46 and has the outer end thereof integrally formed with an enlarged vertically orientated section 58 which rigidly supports a shoe member composed of a pair of oppositely extending and horizontally orientated arms 60 and 62 as seen in FIG. 4. The leading and trailing edges of the shoe member are tapered and, as best seen in FIG. 3, the shoe member is adapted to be located within the guide rail when the vehicle is in the container 10.

From the above description, it should be apparent that the tie-down device 36 is attachable to the frame 20 by inserting the mounting member 46 into the apertures 48 and 50 formed in the frame adjacent the tire as seen in FIG. 2. In instances where the tire does not block the apertures in the frame, the attaching operation is accomplished by inserting the mounting member 46 along a horizontal axis directly into the apertures. If, however, the apertures are partially blocked by the tire as in FIG. 2, by reason of the inclined surface 56 and the spacing between the latter mentioned surface and the mounting member 46, it is possible to tilt the tie-down device 36 relative to the frame so that the small diameter portion of the mounting member 46 passes through the large aperture 48 initially with the longitudinal axis of the mounting member being moved along the tilted axis A—A as seen in FIG. 3. The tie-down device is then pivoted clockwise and the small diameter portion is inserted into the small aperture 50.

Various changes and modifications can be made in the above-described construction without departing from the spirit of the invention. Such changes and modifications are contemplated by the inventors and they do not wish to be limited except by the scope of the appended claims.

We claim:

1. A tie-down device for connecting a side rail of a vehicle frame to a guide track carried by a transporter, said tie-down device comprising a body portion including a pair of angularly related and integrally formed leg members, one of said leg members being vertically orientated and rigidly supporting a cylindrical mounting member, said mounting member being located along a horizontal axis and adapted to be received within a pair of axially aligned apertures in the opposite vertical sides of said side rail, the other of said leg members being located below said mounting member and having a shoe member depending therefrom, said shoe member having a pair of laterally spaced outwardly extending arms located in a horizontal plane and adapted to be received by said guide track for connecting the vehicle frame thereto.

2. A tie-down device for connecting the rear end of a vehicle frame to a guide rail carried by a transporter, said tie-down device comprising a generally L-shaped body including a pair of integrally formed leg members, one of said leg members being vertically orientated and rigidly supporting a stepped cylindrical mounting member at the upper end thereof, said mounting member being located along a horizontal axis and adapted to be received within a pair of axially aligned circular apertures of different diameters formed in the opposite sides of said vehicle frame, the other of said leg members being located below said mounting member and having a downwardly inclined surface facing said mounting member so as to provide a space between said mounting member and said surface for receiving a portion of said vehicle frame, and a shoe member depending from the other of said leg members and including a pair of laterally spaced outwardly extending arms located in a plane parallel to said horizontal axis and adapted to be received by said guide rail for connecting the vehicle frame thereto.

* * * * *